(No Model.)
J. BERMEL.
AXLE NUT.
No. 486,023. Patented Nov. 8, 1892.
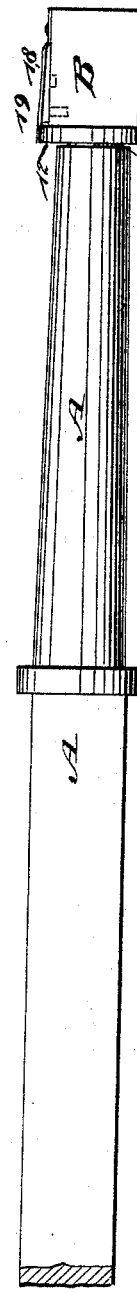
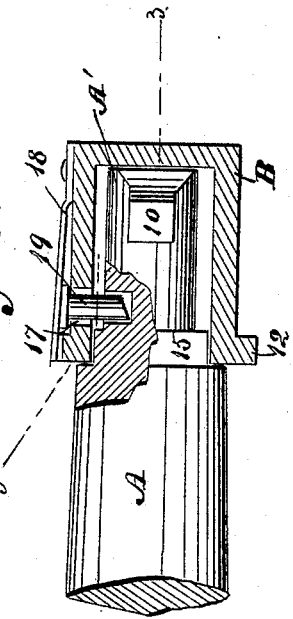
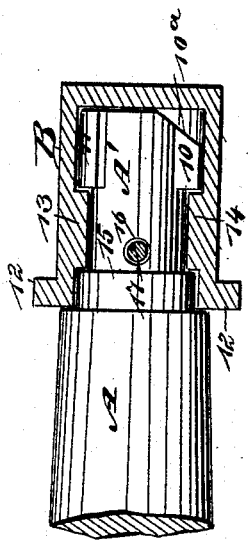
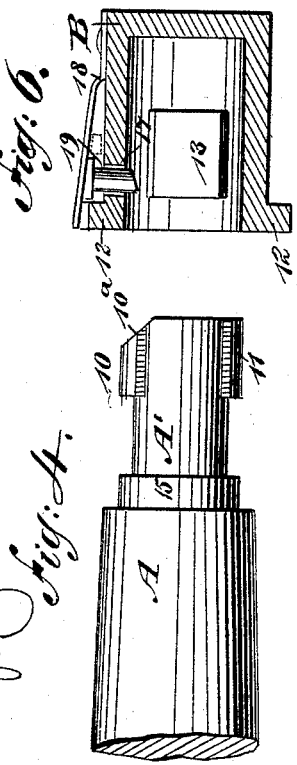
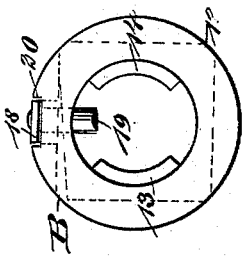
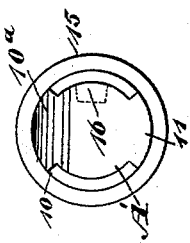
WITNESSES:
Chas. Niola
C. Sedgwick
INVENTOR
J. Bermel
BY
Munn & Co
ATTORNEYS.

UNITED STATES PATENT OFFICE.

JOSEPH BERMEL, OF MIDDLE VILLAGE, NEW YORK.

AXLE-NUT.

SPECIFICATION forming part of Letters Patent No. 486,023, dated November 8, 1892.

Application filed June 24, 1892. Serial No. 437,881. (No model.)

*To all whom it may concern:*

Be it known that I, JOSEPH BERMEL, of Middle Village, in the county of Queens and State of New York, have invented a new and useful Improvement in Axle-Nuts, of which the following is a full, clear, and exact description.

My invention relates to an improvement in axle-nuts, and has for its object to provide a nut of that description which is capable of ready attachment to any form of axle and which when applied to an axle will remain in place and in the position in which it was located when first applied, no matter to what extent the axle may be vibrated.

Another feature of the invention is to provide an axle-nut which will be strong, simple, and economic, and at the same time sightly, and which, also, may be conveniently and readily removed when such action is necessary.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of one end of the axle, illustrating the application of the nut thereto. Fig. 2 is a section taken vertically through the nut, showing that portion of the axle to which the nut is to be applied partially in side elevation and partially broken away. Fig. 3 is a section taken horizontally and on the line 3 3 of Fig. 2. Fig. 4 is a side elevation of one outer extremity of the axle, illustrating the manner in which it is constructed to receive the improved nut. Fig. 5 is an end view of the axle. Fig. 6 is a central longitudinal section through the axle-nut, and Fig. 7 is a face view of the nut.

The reduced end A' of the axle A, and upon which the nut B is to be fitted, is provided at top and bottom with lugs, the upper lug being designated as 10 and the lower one as 11. These lugs are formed at the extreme outer end of the reduced section A' and are diametrically opposite. The outer face, however, of the upper lug 10 is beveled upward and inward, as shown at $10^a$ in Figs. 4 and 5. The portion A' of the axle upon which the lugs 10 and 11 are produced when the old form of nut is employed is usually threaded to receive the same; but it is the object of this invention to prepare the extremities of the axle in such a manner as to receive a specially-constructed nut which is locked upon the axle instead of being screwed thereon.

The nut B may be of any exterior contour that fancy may dictate or that in practice may be found most desirable. Ordinarily, however, the nut is given an exterior polygonal or rectangular appearance; but the inner chamber of the nut is circular and the inner end or face of the nut is provided with a flange 12. Within the chamber of the nut two diametrically-opposite lugs 13 and 14 are produced. These lugs are located some little distance back of the inner face, as shown in Fig. 6, in which but one lug is visible, and the lugs instead of being arranged at the top and bottom of the nut are arranged one at each side, and the spaces between the lugs of the nut at top and bottom are of such width as to neatly receive the lugs 10 and 11 of the axle. The side edges of the axle-lugs are preferably beveled inward and the upper and lower edges of the lugs of the nut are likewise beveled, so that the edges of the two sets of lugs may be slid readily one upon the other. Near the collar 15 of the axle, in one side face, a recess 16 is produced, and the space between the inner face of the nut and the outer faces of the lugs 13 and 14 of the nut is equivalent, or substantially so, to the width of the collar 15, as shown in Fig. 3. In the top of the nut an aperture or opening 17 is made, and this aperture or opening is located back of the flange and about centrally between the upper portions of the lugs 13 and 14. Some distance back of the aperture or opening 17 one end of a spring 18 is rigidly secured in any suitable manner upon the upper face of the nut, and this spring carries near its inner or free end a pin 19, and the pin is adapted to enter and pass through the opening 17 in the nut. In fact, the pin is in its normal position when it is located in the opening, and the end of the spring projecting beyond the pin is seated in a recess 20, produced in the upper edge of the nut-flange 12, as shown in Fig. 7.

The lower end of the pin is flanged inward, and the pin can only be removed from the interior of the nut when the spring 18 is pried upward, which may be accomplished by passing any suitable instrument beneath it, as shown in dotted lines, Fig. 6, a flat piece of steel, for instance, being used, and then turning the bar edgewise, or the bar may be of wedge shape, so that if it is forced a certain distance beneath the spring the pin will be carried upward a sufficient distance to entirely remove it from the chamber of the nut.

In the operation of placing the nut upon the axle the nut is simply forced over the section A', and the beveled surface $10^a$ of the upper axle-lug 10 will cause the pin 19 of the nut to be forced upward and enable the lugs 10 and 11, as the nut is pushed over them, to pass through the spaces between the upper and lower edges of the lugs 13 and 14 in the nut. The moment that the lugs of the axle have passed the lugs in the nut the pin will drop down upon the surface of the axle-section A', and the nut is then given about a quarter-turn, which will carry the set of lugs in the nut into locking engagement with the lugs upon the axle, and will also bring the pin 19 over the recess 16 in the axle, into which recess the pin will drop. It is evident that a nut of this character is not only expeditiously and conveniently applied, but it is simple and durable in construction, it cannot be shaken off, and it is comparatively noiseless.

As has heretofore been stated, to remove the nut the spring 18 is pried upward until the pin 19 is carried out of the axle-recess 16. The nut is then given a quarter-turn in a direction the reverse of that in which it was first turned, and after this turn has been made the nut may be readily drawn off from the axle.

Having thus described my invention, I claim as new and desire to secure by Letters Patent—

1. The combination, with the axle having opposite lugs on its outer end and an aperture 16 intermediate of said lugs, of the cap B, having internal nuts 13 14 to interlock with the axle-lugs, an opening 17 through the cap near its inner end intermediate of its lugs and registering with the axle-aperture 16, and the spring 18 on the outer side of the cap and having a pin 19 entering said registering apertures, substantially as described.

2. The combination, with an axle provided at ends with diametrically-opposite lugs, the outer face of one lug being beveled, of a nut adapted to be slipped over the end of the axle and provided with oppositely-placed interior lugs, a spring located upon the nut, and a pin carried by the spring and adapted to extend downward within the nut through an aperture formed therein between the lugs of the nut and retracted by the outer beveled face of the axle-lug, substantially as shown and described, whereby the nut may be carried over the lug portion of the axle and turned, bringing the lugs of the nut in locking engagement with those of the axle and the pin in locking engagement with the axle back of its lugs, as and for the purpose specified.

3. The combination, with an axle having lugs formed at its outer end and an upper and a lower lug, the upper lug having an inclined face, and the axle at one side being provided with a recess located at the rear of the lugs, of a nut provided with interior oppositely-located lugs constructed at the sides of the nut, the nut being provided in its upper face with an aperture between the lugs, a spring secured to the upper surface of the nut, and a pin projected downward from the spring through the aperture of the nut, the lower portion of the pin being beveled for contact with the beveled axle-lug, as and for the purpose set forth.

JOSEPH BERMEL.

Witnesses:
HENRY WALTER, Jr.,
GEORGE MAGER.